United States Patent
Kouroutsidis et al.

(10) Patent No.: US 12,236,453 B2
(45) Date of Patent: Feb. 25, 2025

(54) SYSTEMS AND METHODS FOR PROVIDING OFFER INTERFACE PLATFORMS

(71) Applicant: JPMORGAN CHASE BANK, N.A., New York, NY (US)

(72) Inventors: Paul Kouroutsidis, Downingtown, PA (US); Ramakrishna Gajavelli, Gamet Valley, PA (US); Matthew Hoke, Audubon, NJ (US)

(73) Assignee: JPMORGAN CHASE BANK, N.A., New York, GA (US)

( * ) Notice: Subject to any disclaimer, the term of this patent is extended or adjusted under 35 U.S.C. 154(b) by 0 days.

(21) Appl. No.: 17/457,606

(22) Filed: Dec. 3, 2021

(65) Prior Publication Data

US 2023/0177561 A1 Jun. 8, 2023

(51) Int. Cl.
*G06Q 30/0251* (2023.01)
*G06Q 30/0241* (2023.01)

(52) U.S. Cl.
CPC ..... *G06Q 30/0256* (2013.01); *G06Q 30/0277* (2013.01)

(58) Field of Classification Search
CPC ............ G06Q 30/0256; G06Q 30/0277
See application file for complete search history.

(56) References Cited

U.S. PATENT DOCUMENTS

| | | | | |
|---|---|---|---|---|
| 8,799,053 B1 * | 8/2014 | Goldberg | ........... | G06Q 30/0269 705/7.29 |
| 9,747,346 B1 * | 8/2017 | Liu | ..................... | G06Q 30/0259 |
| 11,107,109 B2 * | 8/2021 | Qi | ....................... | G06Q 30/0202 |
| 11,461,796 B1 * | 10/2022 | Donels | ............... | G06Q 30/0215 |
| 11,715,144 B2 * | 8/2023 | Sanghavi | ........... | G06Q 30/0631 705/26.7 |

(Continued)

FOREIGN PATENT DOCUMENTS

CN 112488759 A * 3/2021
WO WO-2011094734 A2 * 8/2011 ....... G06F 17/30867

OTHER PUBLICATIONS

International Search Report and Written Opinion of the International Searching Authority, dated Apr. 11, 2023, from corresponding International Application No. PCT/US2022/080831.

*Primary Examiner* — Marie P Brady
(74) *Attorney, Agent, or Firm* — GREENBERG TRAURIG LLP

(57) ABSTRACT

A method may include a centralized recommendation engine computer program receiving a request for content to display on a mobile electronic device from an ad framework, and requesting offers for the customer based on the customer context from an offer interface platform; the offer interface platform querying a plurality of offer providers for offers, receiving a plurality of ranked offers and an offer identifier for each ranked offer from each of the plurality of offer providers and caching the plurality of ranked offers and an offer identifier for each ranked offer; the centralized recommendation engine computer program receiving the offer identifiers for the ranked offers and providing the offer identifiers for the ranked offers to the ad framework. The ad framework requests content for the ranked offers associated with the offer identifiers from the offer interface platform and generates a webpage with the content in the spaces.

19 Claims, 2 Drawing Sheets

(56) References Cited

U.S. PATENT DOCUMENTS

| | | | |
|---|---|---|---|
| 2004/0039679 A1* | 2/2004 | Norton | G06Q 40/04 |
| | | | 705/37 |
| 2008/0306815 A1* | 12/2008 | Dykes | H04L 67/53 |
| | | | 705/14.73 |
| 2010/0274624 A1* | 10/2010 | Rochford | G06Q 30/02 |
| | | | 705/14.66 |
| 2011/0060651 A1* | 3/2011 | Choi | G06Q 30/0276 |
| | | | 705/14.54 |
| 2012/0278185 A1* | 11/2012 | Ramachandran | G06Q 30/02 |
| | | | 709/219 |
| 2013/0325607 A1* | 12/2013 | Delug | G06Q 30/02 |
| | | | 705/14.53 |
| 2015/0088607 A1* | 3/2015 | Georgoff | G06Q 30/0202 |
| | | | 705/14.46 |
| 2015/0269610 A1 | 9/2015 | Bi et al. | |
| 2015/0294358 A1* | 10/2015 | Galadari | G06Q 30/0257 |
| | | | 705/14.55 |
| 2017/0358009 A1* | 12/2017 | Shah | G06Q 30/0275 |
| 2020/0334703 A1* | 10/2020 | Chang | G06Q 30/0224 |
| 2021/0012379 A1 | 1/2021 | Pope et al. | |
| 2021/0241310 A1* | 8/2021 | Bettencourt-Silvia | G06N 20/00 |
| 2022/0374937 A1* | 11/2022 | Kim | G06Q 30/0244 |
| 2023/0325884 A1* | 10/2023 | Liu | G06Q 30/0251 |
| | | | 705/14.66 |

\* cited by examiner of the invention.

SYSTEMS AND METHODS FOR PROVIDING OFFER INTERFACE PLATFORMS

BACKGROUND OF THE INVENTION

1. Field of the Invention

Embodiments relate generally to systems and methods for providing offer interface platforms.

2. Description of the Related Art

Organizations often outsource targeting to third parties. In order to provide a uniform customer experience, normally only one third party is used to provide such targeted recommendations. This leads to inefficiencies as only the recommendations that are identified by that one third party are used.

SUMMARY OF THE INVENTION

Systems and methods for providing offer interface platforms are provided. In one embodiment, a method may include: (1) receiving, at a centralized recommendation engine computer program executed by a computer processor, a request for content to display on a mobile electronic device from an ad framework comprising a number of spaces and a customer context for a customer; (2) requesting, by the centralized recommendation engine computer program, offers for the customer based on the customer context from an offer interface platform; (3) querying, by the offer interface platform, a plurality of offer providers for offers; (4) receiving, by the offer interface platform, a plurality of ranked offers and an offer identifier for each ranked offer from each of the plurality of offer providers; (5) caching, by the offer interface platform, the plurality of ranked offers and an offer identifier for each ranked offer; (6) receiving, by the centralized recommendation engine computer program, the offer identifiers for the ranked offers; and (7) providing, by the centralized recommendation engine computer program, the offer identifiers for the ranked offers to the ad framework, wherein the ad framework is configured to request content for the ranked offers associated with the offer identifiers from the offer interface platform and to generate a webpage with the content in the spaces.

In one embodiment, the request for content may also include a size for each of the number of spaces.

In one embodiment, the offers may be based on a certain type of good or service.

In one embodiment, the customer context may be based on recent transactions for the customer, a browsing history for the customer, and/or one or more customer accounts used for offer redemptions.

In one embodiment, the customer context may be based on the number of spaces and/or a size of the spaces.

In one embodiment, the offer interface platform may query the plurality of offer providers for contextual offers based on the customer context.

In one embodiment, the method may further include receiving, by the offer interface platform, a campaign list from one of the plurality of offer providers; de-anonymizing, by the offer interface platform, the campaign list; and providing, by the offer interface platform, the de-anonymized campaign list to marketing team.

In one embodiment, the method may further include ranking, by the offer interface platform based on the customer context.

According to another embodiment, a method may include: (1) receiving, at an offer experience service website executed by a computer processor, a request for offers available to a customer; (2) requesting, by the offer experience service website, the offers from a centralized recommendation engine computer program; (3) requesting, by the centralized recommendation engine computer program, the offers from an offer interface platform; (4) querying, by the offer interface platform, a plurality of offer providers for offers; (5) receiving, by the offer interface platform, a plurality of ranked offers and an offer identifier for each ranked offer from each of the plurality of offer providers; (6) caching, by the offer interface platform, the plurality of ranked offers and an offer identifier for each ranked offer; (7) receiving, by the centralized recommendation engine computer program, the offer identifiers for the ranked offers; (8) providing, by the centralized recommendation engine computer program, the offer identifiers for the ranked offers to the offer experience service website; (9) requesting, by the offer experience service website, content for the ranked offers associated with the offer identifiers from the offer interface platform; and (10) generating, by the offer experience service website, a webpage with the content.

In one embodiment, the offers may be based on a certain type of good or service.

In one embodiment, the offers may be based on recent transactions for the customer, a browsing history for the customer, and/or one or more customer accounts used for offer redemptions.

In one embodiment, the request for offers available to a customer may include a customer context for the customer.

In one embodiment, the offer interface platform may query the plurality of offer providers for contextual offers based on the customer context.

In one embodiment, the method may also include ranking, by the offer interface platform based on the customer context.

According to another embodiment, a system may include an electronic device executing a browser or an application; an ad framework in communication with the browser or the application; a centralized recommendation engine executing a centralized recommendation engine computer program that is configured to receive a request for content to display on a mobile electronic device from the ad framework comprising a number of spaces and a customer context; and an offer interface platform that is configured to receive a request for offers for the customer context from the centralized recommendation engine, to query a plurality of offer providers for offers, receives a plurality of ranked offers and an offer identifier for each ranked offer from each of the plurality of offer providers, and to cache the plurality of ranked offers and an offer identifier for each ranked offer. Therein the ad framework is configured to request content for the ranked offers associated with the offer identifiers from the offer interface platform and to generate a webpage with the content in the spaces.

In one embodiment, the request for content may also include a size for each of the number of spaces.

In one embodiment, the offers may be based on a certain type of good or service.

In one embodiment, the customer context may be based on recent transactions for the customer, a browsing history for the customer, and/or one or more customer accounts used for offer redemptions.

In one embodiment, the offer interface platform may query the plurality of offer providers for contextual offers based on the customer context.

In one embodiment, the offer interface platform may be configured to rank the offers based on the customer context.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

The disclosure of U.S. patent application Ser. No. 17/484,902, filed Sep. 24, 2021, is hereby incorporated, by reference, in its entirety.

Embodiments are generally directed to systems and methods for providing offer interface platforms. For example, embodiments may facilitate the federation of multiple partners and may provide a uniform response to any requesting channel. Embodiments may capture customer interactions with presented merchant-offers to provide additional data to an internal recommendation engine and machine learning models.

Figure 1:
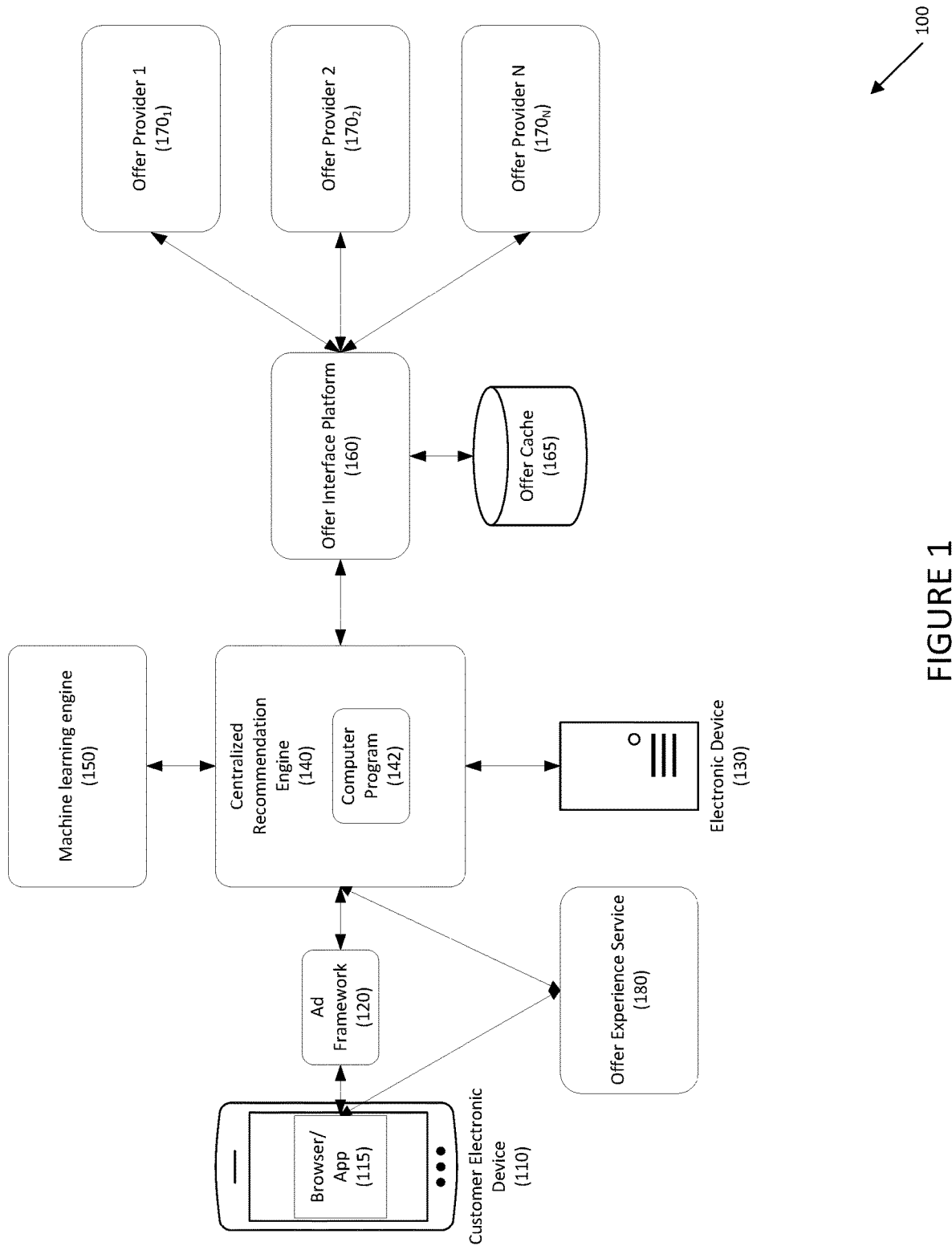
FIG. 1 depicts a system for providing offer interface platforms according an embodiment.

Referring to FIG. 1, a system for providing offer interface platforms is disclosed according to one embodiment. System 100 may include electronic device 130 that may execute centralized recommendation engine 140, which may execute centralized recommendation engine computer program 142. Electronic device 130 may be any suitable electronic device, including servers (e.g., physical and/or cloud-based servers), workstations, computers, etc.

Centralized recommendation engine computer program 142 may interface with offer interface platform 160, which may interface with a plurality of offer providers 170₁, 170₂, . . . 170. Offer interface platform 160 may request offers for a customer, with or without customer context, from offer providers 170.

Offer providers 170 may identify offers for a customer and may return them to offer interface platform 160. Each of the offers may be returned with a unique identifier for the offer and content (e.g., text, graphics, etc.) for the offer.

Offer interface platform 160 may cache the offer identifiers and the offer content in offer cache 165.

Customer electronic device 110 may execute browser or application 115, which may interface with ad framework 120. Customer electronic device 110 may be any suitable electronic device, including computers (e.g., desktops, laptops, tablets), smartphones and smart devices, Internet of Things devices, etc. Ad framework 120 may comprise code that causes browser or application 115 to fetch content to display to the user. In one embodiment, ad framework 120 may identify space available to present offers on the webpage or as in-app offers. Ad framework 120 may retrieve content for offer identifiers from offer interface platform 160 and/or offer cache 165.

In one embodiment, ad framework 120 may be integrated into browser or application 115, may be a plugin or extension, etc.

System 100 may include machine learning engine 150 that may include one or more trained machine learning models. In one embodiment, the machine learning models may be used to identify types of offers to request from offer interface platform 160. The model(s) may be trained using historical data for the customer, for similar customers, etc.

System 100 may further include offer experience service 180. Offer experience service 180 may retrieve and present all offers that a customer is eligible to receive. In one embodiment, the customer may access offer experience service 180 via browser or application 115.

In another embodiment, the offers may be presented based on the customer context.

Offer experience service 180 may receive offer identifiers for offers and may retrieve content for offer identifiers from offer interface platform 160 and/or offer cache 165.

Figure 2:
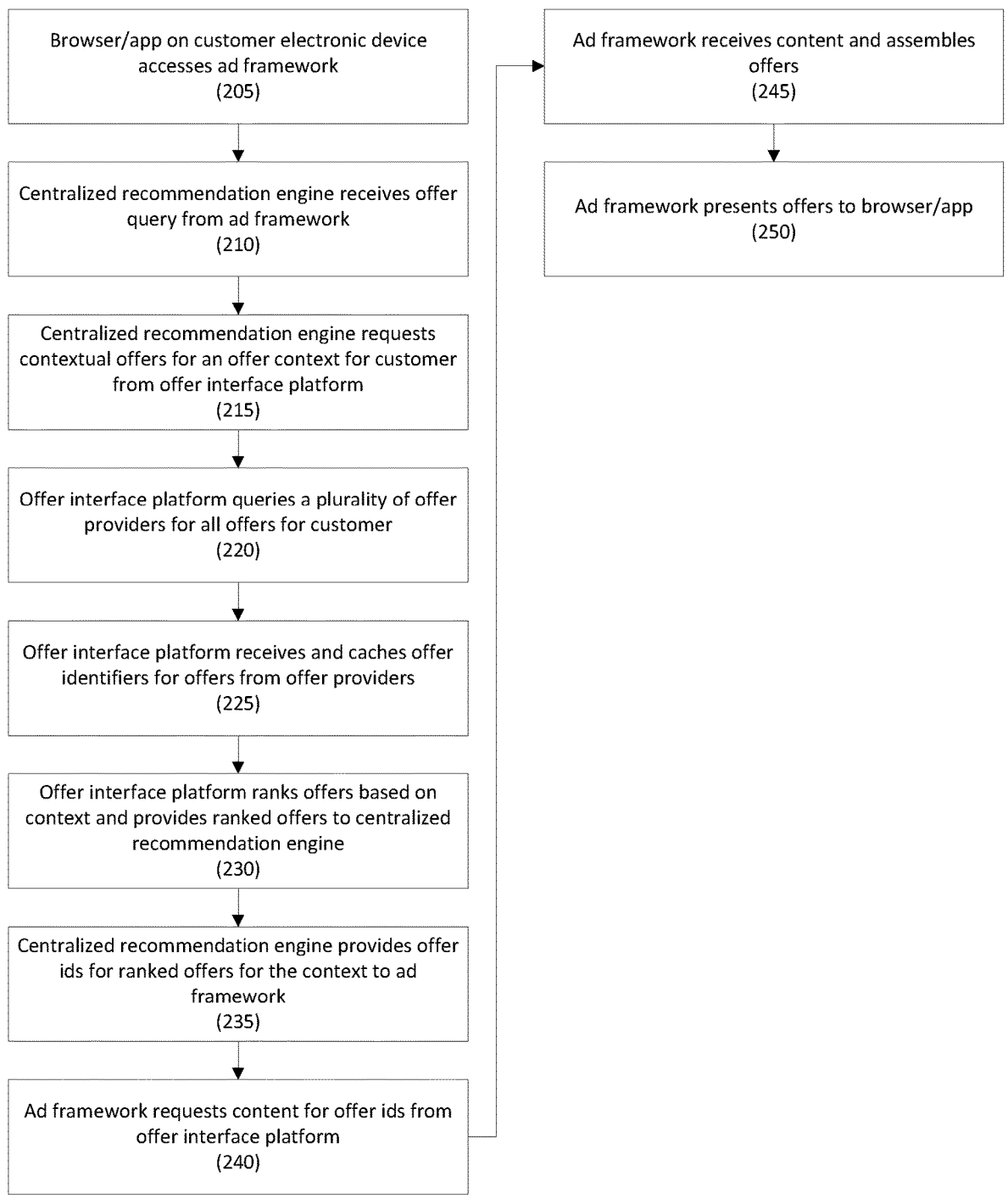
FIG. 2 depicts a method for providing offer interface platforms according an embodiment.

Referring to FIG. 2, a method for using an omnichannel recommendation engine is disclosed according to an embodiment.

In step 205, a browser or computer application executed on a customer electronic device may access an ad framework. For example, the browser or computer application may invoke the ad framework for specific spaces it needs for ad tiles, the sizes of the spaces, etc. The browser or computer application may also pass customer data to the ad framework.

The ad framework may be code that causes the browser or application to fetch content to display to the user. In one embodiment, the ad framework may identify space available to present offers on the webpage or as in-app offers.

In step 210, a centralized recommendation engine computer program may receive an offer query from the ad framework.

In step 215, the centralized recommendation engine computer program may identify the customer and may request contextual offers for a context for the customer from offer interface platform. For example, the centralized recommendation engine computer program may request offers for a certain type of good or service (e.g., dining, travel, entertainment, shopping, services, fuel, etc.). In one embodiment, offers may be identified as "limited time" offers, holiday-specific offers, etc. that may be grouped accordingly.

In one embodiment, the centralized recommendation engine computer program may base the context on known information about the customer, such as recent transactions, browsing history, offer activation types, offer redemption types, accounts primarily used for offer redemptions, tile context (e.g., customer is on a Home lending page so present home improvement offers), etc.

In one embodiment, one or more machine learning models may be invoked to identify the types of offers to request from the offer interface platform. In one embodiment, the machine learning models may be trained based on prior offer acceptance by the customer, by similarly situated customers, etc.

In step 220, the offer interface platform may query a plurality of offer providers for all offers for customer. In one embodiment, the query may not be limited to the context.

In one embodiment, the offer interface platform may receive campaign lists and other information from providers. It may also may de-anonymize the campaign list and send to marketing teams, which may trigger customer communications.

In one embodiment, the query may include a customer identifier, a customer type (e.g., customer ranking, type of credit card or account that the customer has, location, etc.), etc.

In step 225, the offer interface platform may receive and cache the offers and offer identifiers from the offer providers.

In one embodiment, each offer may include an offer identifier and offer content. The offers may be pre-ranked by the offer providers.

In one embodiment, the customer may access all offers via an offer experience service website, which may be provided as an interface to the offer interface platform, that may retrieve all cached offers for which the customer is eligible.

In step 230, the offer interface platform may rank the offers based on the context and may provide the ranked offers for the context to centralized recommendation engine.

In embodiments, the offer interface platform may aggregate the offers from the offer providers and re-rank them as necessary and/or desired. For example, the offer interface platform may re-rank the offers based on the customer context.

In step 235, the centralized recommendation engine may provide the ad framework with offer ids for the ranked offers, and in step 240, the ad framework may request content for the offer ids from offer interface platform. For example, the ad framework may request text, images, etc. for the offer ids.

In step 245, the ad framework may receive the content and may assemble the offers. In one embodiment, the ad framework may further generate a webpage, screen, etc. with the spaces populated with the offers.

In step 250, the ad framework may present the offers to the customer as a webpage or as a screen.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method comprising:
receiving, at a centralized recommendation engine computer program executed by a computer processor, a request for ad content to display on a mobile electronic device from an ad framework, the request f or ad content identifying a number of spaces for the ad content and a customer context fora customer, wherein the request for ad content further comprises a size for each of the number of spaces;
identifying, by the centralized recommendation engine computer program and using a machine learning model, a type of offer to request based on acceptance of a prior offer recommended to the customer;
requesting, by the centralized recommendation engine computer program, offers for the customer f or the type of offer from an offer interface platform;
querying, by the offer interface platform, a plurality of offer providers for offers for which the customer is eligible, wherein the query comprises the customer context, a customer identifier and a type of customer account associated with the customer;
receiving, by the offer interface platform, a plurality of pre-ranked offers and associated offer identifiers from each of the plurality of offer providers, wherein the pre-ranked offers from each of the offer providers are pre-ranked by each of the offer providers;

caching, by the offer interface platform, the plurality of pre-ranked offers and the associated offer identifiers;

aggregating, by the offer interface platform, the plurality of the cached pre-ranked offers;

re-ranking, by the offer interface platform, the plurality of the cached pre-ranked offers based on the customer context;

receiving, by the centralized recommendation engine computer program from the offer interface platform, offer identifiers for the re-ranked offers;

providing, by the centralized recommendation engine computer program, the offer identifiers for the re-ranked offers to the ad framework;

requesting, by the ad framework, the ad content for the re-ranked offers associated with the offer identifiers from the offer interface platform; and generating, by the ad framework, a webpage with the ad content in the spaces.

2. The method of claim 1, wherein the customer context is based on recent transactions for the customer, and a browsing history for the customer.

3. The method of claim 1, wherein the customer context is based on the number of spaces and/or a size of the spaces.

4. The method of claim 1, wherein the customer context is based on a customer account used for offer redemption.

5. The method of claim 1, wherein the type of customer account comprises a type of credit card.

6. The method of claim 1, wherein the query further comprises a customer ranking.

7. A method, comprising:

receiving, at an offer experience service website executed by a computer processor, a request for offers available to a customer for which the customer is eligible;

receiving a request for ad content, wherein the request for ad content further comprises a size for each of a number of spaces for the ad content;

requesting, by the offer experience service website, the offers from a centralized recommendation engine computer program executed by a computer processor;

identifying, by the centralized recommendation engine computer program and using a machine learning model, a type of offer to request based on acceptance of a prior offer recommended to the customer;

requesting, by the centralized recommendation engine computer program, the offers for the type of offer from an offer interface platform;

querying, by the offer interface platform, a plurality of offer providers for offers for which the customer is eligible, wherein the query comprises a customer context, a customer identifier and a type of customer account associated with the customer;

receiving, by the offer interface platform, a plurality of pre-ranked offers and associated offer identifiers from each of the plurality of offer providers, wherein the pre-ranked offers from each of the offer providers are pre-ranked by each of the offer providers;

caching, by the offer interface platform, the plurality of pre-ranked offers and the associated offer identifiers;

aggregating, by the offer interface platform, the plurality of the cached pre-ranked offers;

re-ranking, by the offer interface platform, the plurality of the cached pre-ranked offers based on the customer context, wherein the customer context is based on recent transactions for the customer, a browsing history for the customer, and/or one or more customer accounts used for offer redemptions;

receiving, by the centralized recommendation engine computer program from the offer interface platform, offer identifiers for the re-ranked offers;

providing, by the centralized recommendation engine computer program, the offer identifiers for the re-ranked offers to the offer experience service website;

requesting, by the offer experience service website, ad content for the re-ranked offers associated with the offer identifiers from the offer interface platform; and generating, by the offer experience service website, a webpage with the ad content in the spaces.

8. The method of claim 7, wherein the offers are based on a certain type of good or service.

9. The method of claim 7, wherein the offers are based on recent transactions for the customer, and/or a browsing history for the customer.

10. The method of claim 7, wherein the request for offers available to a customer comprises a customer context for the customer.

11. The method of 7, wherein the customer context is based on a customer account used for offer redemption.

12. The method of claim 7, wherein the type of customer account comprises a type of credit card.

13. The method of claim 7, wherein the query further comprises a customer ranking.

14. A system, comprising:

an electronic device executing a browser or an application;

an ad framework in communication with the browser or the application;

a centralized recommendation engine executed by the electronic device and executing a centralized recommendation engine computer program, the centralized recommendation engine configured to receive a request for ad content to display on a mobile electronic device from the ad framework, the request for ad content identifying a number of spaces for the ad content and a customer context for a customer, wherein the request for ad content further comprises a size for each of the number of spaces; and an offer interface platform that is configured to receive a request for offers for the customer context from the centralized recommendation engine;

the centralized recommendation engine is configured to identify, using a machine learning model, a type of offer to request based on acceptance of a prior offer recommended to the customer;

the offer interface platform is configured to query a plurality of offer providers for offers for the type of offer, wherein the query comprises the customer context, a customer identifier and a type of customer account associated with the customer, to receive a plurality of pre-ranked offers and associated offer identifiers from each of the plurality of offer providers, wherein the pre-ranked offers from each of the offer providers are pre-ranked by each of the offer providers, to cache the plurality of pre-ranked offers and the associated offer identifiers, to aggregate the plurality of the cached pre-ranked offers, and to re-rank the plurality of the cached pre-ranked offers based on the customer context;

the centralized recommendation engine is further configured to reconceive, from the offer interface platform, offer identifiers for the re-ranked offers and to provide the offer identifiers for the re-ranked offers to the ad framework;

the ad framework is configured to request the ad content for the re-ranked associated with the offer identifiers from the offer interface platform and to generate a webpage with the ad content in the spaces.

15. The system of claim 14, wherein the offers are based on a certain type of good or service.

16. The system of claim 14, wherein the customer context is based on recent transactions for the customer, and/or a browsing history for the customer.

17. The system of claim 14, wherein the customer context is based on a customer account used for offer redemption.

18. The system of claim 14, wherein the type of customer account comprises a type of credit card.

19. The system of claim 14, wherein the query further comprises a customer ranking.

* * * * *